United States Patent [19]

Marzola et al.

[11] Patent Number: 5,536,349
[45] Date of Patent: Jul. 16, 1996

[54] PROCESS FOR COATING METAL PIPES WITH POLYOLEFIN MATERIALS

[75] Inventors: Roberto Marzola; Gian L. Rigosi, both of Ferrara, Italy

[73] Assignee: Montell North America Inc., Wilmington, Del.

[21] Appl. No.: 223,254

[22] Filed: Apr. 4, 1994

[30] Foreign Application Priority Data

Apr. 6, 1993 [IT] Italy .................................. MI93A0676

[51] Int. Cl.⁶ .................................................... B32B 31/00
[52] U.S. Cl. ........................ 156/187; 156/188; 427/388.2; 525/193; 525/194
[58] Field of Search .................................. 156/188, 187; 525/194, 193; 427/388.2

[56] References Cited

U.S. PATENT DOCUMENTS 4,372,796  2/1983  Grevel ..................... 156/187
4,618,654  10/1986  Schmidtchen et al. ................. 525/193
5,244,976  9/1993  Brosius et al. .

FOREIGN PATENT DOCUMENTS 0004034   9/1979   European Pat. Off. .
0124247   11/1984  European Pat. Off. .
0412518   8/1990   European Pat. Off. .
0400333   12/1990  European Pat. Off. .
55-117647 9/1980   Japan ..................................... 156/187
56-39386  4/1981   Japan .
900385    4/1990   WIPO .

OTHER PUBLICATIONS

JP 5609886 (Abstract Only).

*Primary Examiner*—John J. Gallagher

[57] ABSTRACT

Process for coating metal pipes, where the coating materials used are specific polyolefin compositions partially crosslinked by grafting the polyolefin backbone with an alkenyl-substituted alkoxysilane and then reacting the grafted polyolefin with water.

5 Claims, No Drawings

PROCESS FOR COATING METAL PIPES WITH POLYOLEFIN MATERIALS

The present invention concerns a process for the coating of metal pipes with polyolefin materials. Metal pipes usually made of steel and coated with plastic materials are widely used for the construction of pipe-lines destined for the conveyance of fluid materials, such as oil, natural gases or water, even for long distances.

Said pipe-lines must be able to withstand the most varied environmental conditions, and in some cases, the high temperatures which are maintained in the vicinity of pumping stations, for example, or may be typical of certain fluids which are extracted directly from the subsoil. Therefore the coatings must be carefully selected in order to obtain high levels of corrosion resistance. Some types of coatings made with polyolefin materials have been found to be particularly suited for this purpose.

Moreover, in order not to create weak points in the line (at the welded points between the pipes, for example) one must be able to repair the damaged or removed portions of the above mentioned coating in such a way as to obtain mechanical properties which are as similar as possible to those of the original coating.

Published European Patent Application n. 444446 teaches that the removed or damaged portions of polyolefin material coatings of metal pipes can be efficiently repaired by using patches or strips of polypropylene materials which are fastened to the pipes by way of specific adhesive polymer compositions. However, the above mentioned polypropylene materials which are based on polymers which are not crosslinked, are not suited for coating large segments of metal pipes, and require accurate application procedures. In particular, given the flow viscoelasticity of the above polymers in the molten state, their heating step, which is protracted until the softening or melting point is reached in order to obtain optimal adhesion, must be carried out in such a way as to avoid nonhomogeneity and/or lacerations in the final coating.

For this purpose heat sources are used which allow one to obtain homogeneous heat and avoid the use of flame in direct contact with the polymer, such as, for example, radiant panels, electric heating coils, induction ovens or infra-red lamps.

The above mentioned devices, moreover, allow one to obtain good heat diffusion inside the layer of the polyolefin coating. However, said devices are relatively complex and expensive, and are not always readily available at the sites where the pipes are being laid.

This invention provides a new process for coating metal pipes based on the use of certain partially crosslinked olefin polymers which, besides giving the coating high mechanical and corrosion resistance characteristics, also have the advantage of being easy to apply to the metal pipes by using extremely simple pre-heating and post-heating devices, such as gas torches. In spite of the fact that said devices produce localized and nonhomogeneous heat, the polymers used in the process of the present invention do not create nonhomogeneity and/or tearing problems, and allow one to obtain a good and homogeneous heat diffusion throughout the coating layer.

Moreover, because of the high viscoelasticity in the molten state, of said partially crosslinked olefin polymers films, tapes or strips thereof can be easily used to coat long sections of metal pipes, since they can withstand considerable mechanical stress, even in the molten state, without tearing.

The coating material in the process of this invention is a polyolefin composition comprising:

(A) 10–60, preferably 20–50, parts by weight of homopolymer polypropylene having an isotactic index higher than 90, particularly ranging from 95 and 98, or a crystalline copolymer of propylene with ethylene and/or with a $CH_2=CHR$ α-olefin, where R is an alkyl radical with 2–6 carbon atoms, containing over 85% by weight of propylene and having an isotactic index higher than 85%, or mixtures thereof;

(B) 10–40 parts by weight of a polymer fraction containing ethylene, which is insoluble in xylene at ambient temperature;

(C) 30–60, preferably 30–50, parts by weight of an amorphous ethylene-propylene copolymer fraction containing 40–70% by weight of ethylene and optionally containing minor proportions of a diene, which fraction is soluble in xylene at ambient temperature;

said polyolefin composition being crosslinked by grafting onto the polyolefin backbone an alkenyl-substituted alkoxysilane, and then reacting with water until one obtains hot-set values, according to the method CEI 20-31 explained hereafter, lower than 175%, preferably lower that 120%, at 200° C., and lower than 15%, preferably lower than 10%, at 23° C.

Polymer compositions comprising (A)+(B)+(C) are described in published European patent application n. 400333.

Generally, the total content of polymerized ethylene in the above mentioned compositions ranges from 20 to 60% by weight.

The $CH_2=CHR$ α-olefin of fraction (A), where R is an alkyl radical with 2–6 carbon atoms, is preferably selected from 1-butene, 1-pentene, and 4-methyl-1-pentene.

The diene of fraction (C) is preferably selected from butadiene, 1,4-hexadiene, 1,5-hexadiene, ethylidine-1-norbornene and may be present in an amount from 1 to 10% by weight, preferably 1 to 5% by weight.

The molecular weight of the various fractions (determined by measuring the intrinsic viscosity in tetrahydronaphthalene at 135° C.) varies, depending on the nature of the components and the total melt index of the composition, and it is preferably between the following limits:

0.5–3 dl/g for fraction (A);

2–8 dl/g for fractions (B) and (C).

The electronic microscope examination of the compositions indicates that the dispersed phase is made up of an amorphous ethylene-propylene copolymer, and the average dimensions of its particles is less than 2 μm.

Preferred examples of alkenyl-substituted alkoxysilanes are those of formula $SiR_n(OR')_{4-n}$ wherein R is vinyl or allyl, R' is a $C_1$–$C_8$ alkyl radical, n is 1, 2 or 3.

Specific examples of alkenyl-substituted alkoxysilanes used to obtain the crosslinking of the above compositions are vinyltriethoxysilane, allyltriethoxysilane and divinyltriethoxysilane.

Generally, the alkenyl-substituted alkoxysilanes are grafted onto the polyolefin backbone through the alkenyl moiety by extrusion in the presence of peroxides, such as dicumylperoxide, tert-butyl peroxypivalate and 2,5-dimethyl-2,5-di(tert-butylperoxy)hexane. Extruders which are well known in the art are used for this purpose at temperatures ranging from 180° to 230° C.

The quantity of alkenyl-substituted alkoxysilane used generally ranges from 1% to 3% by weight with respect to the polyolefin composition; the quantity of peroxide used generally ranges from 0.05% to 0.2% by weight with respect to the polyolefin composition.

The polymer material thus obtained is then contacted with water, by exposing it to steam or moisture in the air, for example, or by immersing it in water at ambient temperature or higher, in order to obtain crosslinking. To promote said crosslinking it is preferred that prior to the water treatment the polymer composition grafted with the silane be subjected to an additional extrusion step where a crosslinking catalyst is added. The conditions and apparatuses used in said extrusion step are the same used for the grafting with the silane. Preferred examples of cross-linking catalysts are tin dioctate and tin dibutyl dilaurate; generally the cross-linking catalysts are added in quantities ranging from 0.15 to 0.3% with respect to the polymer.

The reaction with water can also occur after the grafted polymer composition has been converted into films, tapes or strips to be used in the process of the present invention, which will be described in more detail later on.

The hot-set test according to CEI 20–31 (a standard test method published in Italy by Comitato Elettrotecnico Italiano, 259 Viale Monza, 20126 Milano, Italy) allows one to verify that the crosslinking has reached the desired levels for the process of the present invention. The hot-set values at 200° C. are obtained by subjecting the specimens to a load of 0.2 MPa for 15 minutes at the above mentioned temperature, and measuring the percentage elongation of the specimens. The values at 23° C. are obtained by maintaining the same specimens at 200° C. for 5 minutes without load, and then cooling them to 23° C. Thus one obtains an evaluation of the capability of the crosslinked polyolefin composition to withstand mechanical stress in the molten state, and of its elastic recovery after stress release and cooling.

The crosslinked polyolefin composition can be applied to the metal pipe directly or indirectly.

In the case of direct application, the crosslinked polyolefin composition is mixed, either before or after the crosslinking step, with a polypropylene which is modified with maleic anhydride, isophorone bismaleamic acid or acrylic acid in quantities ranging from 1% to 10% by weight. The quantity of modified polypropylene which is added to the crosslinked polyolefin composition preferably ranges from 1% to 10% by weight, more preferably from 1 to 5% by weight, with respect to the total weight. Said modified polypropylene is a homopolymer or copolymer with various degrees of crystallinity, and can be prepared, according to known methods, by mixing in the solid state the polypropylene and maleic anhydride, isophorone bismaleamic acid or acrylic acid, preferably in the presence of radical initiators, such as organic peroxides. As an alternative, one can add to the crosslinked polyolefin composition some concentrates of the polypropylene with the modifying agent (i.e., maleic anhydride, isophorone bismaleamic acid or acrylic acid) and the radical initiator, thus causing the modification in situ during the mixing step. In any case, said mixing step is carried out by extrusion in the molten state using the methods described above.

In order to proceed with the coating of the pipes, the polyolefin composition obtained in such a manner is converted into films, tapes, or strips preferably from 300 to 1000 μm thick. At the time of the conversion of said crosslinked polyolefin composition into films, tapes or strips, one can apply tension to the hot product which has already solidified (ca. 100°–130° C.) thus obtaining a thermoshrinkable film, tape or strip (thermoshrinkability preferably ranging from 5 to 20%).

Thermoshrinkability of the materials means that the surface of said materials is reduced by the effect of heat, and it is determined by placing a specimen of the material, with known dimensions, into an oven at 120°–130° C. for ten minutes, and measuring said specimen at the end of the treatment. If a dimension of the specimen before heating is I, and after heating is I', the thermoshrinkability percentage is obtained with the following formula:

$$[(I-I')/I] \times 100$$

In cases where the crosslinked polyolefin composition is applied to the metal pipe indirectly, there is hot-melt adhesive between the crosslinked composition and the pipe. The adhesive is preferably selected from polyolefin compositions consisting essentially of from 90 to 99% by weight of one or more propylene random copolymers having a melt temperature (determined by DSC, i.e., Differential Scanning Calorimetry) ranging from 130° C. and 145° C., and from 1 to 10% by weight of the above mentioned polypropylene modified with maleic anhydride, isophorone bismaleamic acid or acrylic acid. In particular, the above mentioned random copolymers are selected from:

propylene/ethylene copolymers having a polymerized ethylene content of from 1 to 10% by weight;

copolymers of propylene and one or more $C_4$–$C_8$ α-olefins containing from 2 to 15% by weight of the α-olefin(s);

copolymers of propylene with ethylene and one or more $C_4$–$C_8$ α-olefins, containing from 1.5 to 5% by weight of ethylene, and from 2.5 to 10% by weight of the above mentioned $C_4$–$C_8$ α-olefins;

mixtures of (weight percentages):
1) 30–65%, preferably 35–65%, more preferably 45–65%, of a copolymer of propylene with a $C_4$–$C_8$ α-olefin, containing from 98 to 80%, preferably from 95 to 85%, of propylene;
2) 35–70%, preferably 35–65%, more preferably 35–55%, of a propylene/ethylene copolymer with optionally from 2 to 10%, preferably from 3 to 6%, of a $C_4$–$C_8$ α-olefin, where the ethylene content ranges from 2 to 10%, preferably from 7 to 9%, when the $C_4$–$C_8$ α-olefin is not present, and from 0.5 to 5%, preferably from 1 to 3%, when the $C_4$–$C_8$ α-olefin is present.

In the above mentioned random copolymers the $C_4$–$C_8$ α-olefins are preferably selected from those listed for the crosslinked polyolefin compositions described above. The mixtures of random copolymers (1) and (2), which are particularly preferred are described in published European patent application 483523.

Generally, both the polyolefin compositions comprising fractions (A), (B), and (C), which are eventually crosslinked, and the random propylene copolymers contained in the above mentioned hot-melt adhesives are prepared by one or more polymerization steps using highly stereospecific Ziegler-Natta catalysts. In particular, one may use catalysts comprising the product of the reaction of (1) a solid component containing a titanium compound and an internal electron-donor compound supported on magnesium chloride, (2) an Al-alkyl compound and (3) an external electron-donor compound.

The preferred titanium compound is the $TiCl_4$, and preferably the internal donor is selected from the di- and polyethers and alkyl, cycloalkyl, or aryl phthalates, such as for example diisobutyl, di-n-butyl and di-n-octyl phthalate.

The external donor is preferably selected from the silicon compounds containing one or more —OR groups, where R is a hydrocarbon radical. Specific examples are: diphenyldimethoxysilane, dicyclohexyldimethoxysilane, methyl-tert-butyldimethoxysilane, diisopropyldimethoxysilane and phenyltriethoxysilane.

In cases where one uses between the crosslinked composition and the pipe the hot-melt adhesive described above, the crosslinked polyolefin composition which makes up the coating material is used as is, without adding the polypropylene modified with maleic anhydride, isophorone bis-maleamic acid or acrylic acid. Said crosslinked polyolefin composition is used in the form of films, tapes or strips having the thickness mentioned above. Also the hot-melt adhesive can be used in the coating process in the form of films, tapes or strips with a thickness preferably ranging from 50 to 800 μm. As an alternative, an equivalent thickness of hot-melt adhesive can be coextruded on the side of the crosslinked polyolefin composition film, tape or strip which is put in contact with the pipe to be coated, or can be obtained by applying a layer of powder of said adhesive.

The outside surface of the pipe in question which must be coated with the above mentioned materials can be subjected to a cleaning pretreatment, for example with a brush or by sanding.

At any rate, it is best if before applying the adhesives and coating materials, one applies to the outside surface of the pipe one or more primers (such as epoxy resins, silanes, or chromates, for example). It is also preferable to heat the area to be coated before the adhesive and coating material are applied. For this purpose one can simply use the gas torches mentioned above. As a way of example, the temperature of the exposed metal during the above mentioned heating step is brought to about 80°–200° C. The coating is then easily obtained by wrapping the pipes with the above mentioned crosslinked polyolefin composition films, tapes or strips, optionally interposing hot-melt adhesives, and heating the layer of polyolefin material obtained in this manner. The temperature during this heating step may reach 150° to 220° C., for example. In order to obtain the best adhesion of the final coating, the crosslinked polyolefin composition films, tapes, or strips are kept under tension during the above mentioned heating step, which, thanks to their thermoshrinkable capacity, allows a good elastic recovery.

As previously stated, due to the high viscoelasticity of the crosslinked polyolefin compositions in the molten state, one can maintain the above mentioned tensions throughout the heating step without causing nonhomogeneity and/or tearing in the final coating. One can also use gas torches as a source of heat without running into the above mentioned problems Obviously, although not necessary, in every heating step one can also use more sophisticated devices such as radiant panels, electric heating coils, induction ovens, or infrared lamps.

The following examples are given in order to illustrate and not limit the present invention.

EXAMPLE 1

The outside surface of a section of steel pipe 2 meters long, 6 mm thick, and with a diameter of 273 mm, is sanded to a degree of finish equal to Sa 2½ (method SIS 055900). Said section of pipe is then heated to 180°–200° C. with a gas torch, and a layer of about 100 μm of a single-component epoxy primer in powder form is applied (Eurokote 714-32 powder marketed by Biotumes Spéciaux). Subsequently the pipe is wrapped with a tape consisting of a hot-melt adhesive film with a thickness of 400 μm. Said adhesive film, based on propylene random copolymers, melts at 141° C. (DSC analysis) and has the following composition (weight percentages):

48.25% propylene/ethylene copolymer comprising 4% of ethylene;

48.25% propylene/1-butene copolymer comprising 15% of 1-butene;

3.5% of polypropylene homopolymer modified with 1.6% maleic anhydride.

The section of pipe is then wrapped with a tape consisting of a 600 μm thick film made of a crosslinked polyolefin composition. Said composition has been prepared starting with a uncrosslinked heterophasic composition consisting of (weight percentages):

A) 40% of homopolymer of propylene having an isotactic index of 97.5%;

B) 15% of a polymer fraction containing ethylene, insoluble in xylene at ambient temperature;

c) 45% of an amorphous ethylene/propylene copolymer fraction containing 50% of ethylene, and soluble in xylene at ambient temperature.

The above mentioned heterophasic composition is extruded at 190° C. with 2 parts by weight of vinyltriethoxysilane and 0.1 parts by weight of dicumylperoxide per 100 parts by weight of heterophasic composition. Using the same extrusion method, the polymer product thus obtained has been further mixed with 0.2 parts by weight of tin dibutylaurate per 100 parts by weight of polymer product, and the total mixture has been converted into the above mentioned film using a flat extrusion die. The film was then kept in water at 23° C. for 48 hours in order to obtain crosslinking.

The resulting film of the polyolefin composition has hot-set values of 70–80% at 200° C., and 0–8% at 23° C., calculated by way of CEI 20-31, and a thermoshrinkability of 15%. During the entire coating step, the temperature of the section of the pipe is maintained at 180°–200° C. using a gas torch as the heating device. The film is wrapped while being maintained under tension, which is about 1N/centimeter of film width, for example.

In Table 1 are shown the results of the adhesion test at 100° C., impact and cathode peeling resistance at 23° C.

EXAMPLE 2

The procedure is the same as for Example 1, but in this case the coating is done using a single ribbon shaped film obtained by coextruding the hot-melt adhesive and crosslinked polyolefin composition film of Example 1. In this case the crosslinking is obtained by simply exposing the coextruded film to air humidity.

The hot-melt layer of the coextruded film is 50 μm thick, while the cross-linked polyolefin composition layer is 450 μm thick. The coextruded film has a thermoshrinkability of 15%.

The adhesion, impact and cathodic peeling resistance of the coextruded film are shown in Table 1. As one can see from the table, said properties are the same as those obtained for Example 1.

The same results, coupled with the advantage of a more homogeneous coating when the latter is applied to long sections of pipes, are obtained by wrapping the pipes with a tape made up of a hot-melt adhesive film described in Example 1 and 500 μm thick, and then with a tape made up of the coextruded film described above, using the same application techniques as for Example 1.

EXAMPLE 3

The procedure is as for Example 1, but the tape used for the coating is made up of a 800 μm thick film obtained in the following manner.

The same uncrosslinked heterophasic composition as used in Example 1 is crosslinked in the same way as in Example 1, but during extrusion, together with the vinyltriethoxysilane, 3.5 parts by weight of a concentrate is added having the following composition (weight percentages):

94% of the same uncrosslinked heterophasic composition of Example 1;

5% of maleic anhydride;

1% of 2,5-dimethyl-2,5-di(tert-butylperoxy)hexane.

The product thus obtained is then crosslinked with water and converted into film by using the same procedure described in Example 1.

In Table 1 are shown the results of the adhesion test, impact and cathode peeling resistance.

Comparative Example 1

The process is the same as for Example 1, with the difference that the coating material used is a tape made of the uncrosslinked heterophasic composition described in Example 1, which is neither extruded with vinyltriethoxysilane nor subsequently crosslinked. The coating obtained has large tears and splits in the polymer layer.

TABLE 1

| TEST | METHOD | CONDITIONS | UNIT | EX. 1 | EX. 2 | EX. 3 |
| --- | --- | --- | --- | --- | --- | --- |
| Adhesion at 23° C. | DIN 30670 | 90° angle 10 mm/min 5 cm tape | N/mm | 8–12 | 8–12 | 8–12 |
| Adhesion at 100° C. | DIN 30670 | 90° angle 10 mm/min 5 cm tape | N/mm | 2–4 | 2–4 | 2–4 |
| Impact resistance at 23° C. | DIN 30670 | 25 mm plunger rigid impact | Nmm/mm | 10–12 | 10–12 | 10–12 |
| Cathode peeling at 23° C. | BRITISH GAS PS-CW6 | duration: 28 days tension: 1.5 V solution: 3% NaCl | mm advance | 5–10 | 5–10 | 5–10 |

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

What is claimed is:

1. A process for coating a metal pipe, which comprises (1) applying a film, tape or strip of a partially crosslinked polyolefin composition to the pipe, one of said pipe and film, tape or strip being in association with a modified polypropylene which, when in association with the pipe, is part of a hot melt adhesive on the pipe, and, when in association with the film, tape or strip, is part of said partially crosslinked polyolefin composition, or is part of a hot melt adhesive that is a layer on the side thereof adjacent the pipe, and (2) applying sufficient heat thereto to melt the modified polypropylene, and thereby cause the film, tape or strip to adhere to the pipe, said polyolefin composition before being partially crosslinked comprising:

A) 10–60 parts by weight of propylene homopolymer with an isotactic index higher than 90, or a crystalline copolymer of propylene with ethylene and/or with a $CH_2=CHR$ α-olefin, where R is alkyl with 2–6 carbon atoms, containing over 85% by weight of propylene and having an isotactic index higher than 85%, or mixtures thereof;

B) 10–40 parts by weight of a polymer fraction containing ethylene, insoluble in xylene at ambient temperature; and C) 30–60 parts by weight of an amorphous ethylene-propylene copolymer fraction optionally containing minor proportions of a diene, soluble in xylene at ambient temperature, and containing 40–70% by weight of ethylene;

said polyolefin composition having been crosslinked by grafting reaction thereof with an alkenyl-substituted alkoxysilane, and then reaction of the resulting reaction product with water until the thus partially crosslinked composition has hot-set values, according to standard test method CEI 20-31, lower than 175% at 200° C., and lower than 15% at 23° C., said modified polypropylene consisting essentially of a polypropylene modified with 1–10% by weight of maleic anhydride, isophorone bismaleamic acid or acrylic acid, and being 1–10% by weight of said partially crosslinked polyolefin composition when it is part thereof, and the hot-melt adhesive in either case consisting essentially of 90–99% by weight of at least one propylene copolymer having a DSC melt temperature of 130°–145° C., and 1–10% by weight of said modified polypropylene.

2. The process of claim 1, wherein the alkenyl-substituted alkoxysilane is selected from the group consisting of vinyltriethoxysilane, allyltriethoxysilane and divinyldimethoxysilane.

3. The process of claim 1, wherein the modified polypropylene is part of said partially crosslinked polyolefin composition.

4. The process of claim 1, wherein the modified polypropylene is part of a hot-melt adhesive layer on the metal pipe.

5. A process according to claim 1, in which the film, tape or strip, when applied to the pipe, has 5–20% thermoshrinkability.

* * * * *